United States Patent
Sebald (10) Patent No.: US 9,053,441 B2
(45) Date of Patent: Jun. 9, 2015

(54) SYSTEMS AND METHODS FOR REGULATORY COMPLIANCE WITH QUALIFIED SYSTEMS

(75) Inventor: Vincent Joseph Sebald, La Jolla, CA (US)

(73) Assignee: GxPReady, Inc., San Diego, CA (US)

( * ) Notice: Subject to any disclaimer, the term of this patent is extended or adjusted under 35 U.S.C. 154(b) by 0 days.

(21) Appl. No.: 13/356,165

(22) Filed: Jan. 23, 2012

(65) Prior Publication Data

US 2012/0278900 A1 Nov. 1, 2012

Related U.S. Application Data

(60) Provisional application No. 61/435,448, filed on Jan. 24, 2011.

(51) Int. Cl.
| | | |
|---|---|---|
| *G06F 7/04* | (2006.01) | |
| *G06F 9/44* | (2006.01) | |
| *G06Q 10/06* | (2012.01) | |
| *G06F 11/36* | (2006.01) | |

(52) U.S. Cl.
CPC ............ *G06Q 10/06* (2013.01); *G06F 11/3604* (2013.01); *G06F 11/3672* (2013.01)

(58) Field of Classification Search
CPC ........................ G06F 11/3604; G06F 11/3672
USPC ............................................. 726/28; 717/121
See application file for complete search history.

(56) References Cited

U.S. PATENT DOCUMENTS

| | | | | |
|---|---|---|---|---|
| 7,930,727 | B1* | 4/2011 | Baize et al. | 726/1 |
| 8,020,030 | B1* | 9/2011 | Adams | 714/2 |
| 8,364,702 | B2* | 1/2013 | Kerr et al. | 707/769 |
| 2001/0042124 | A1* | 11/2001 | Barron | 709/227 |
| 2001/0056354 | A1* | 12/2001 | Feit et al. | 705/1 |
| 2002/0026507 | A1* | 2/2002 | Sears et al. | 709/224 |
| 2004/0169591 | A1* | 9/2004 | Erkkinen | 340/945 |
| 2005/0289527 | A1* | 12/2005 | Illowsky et al. | 717/148 |
| 2006/0122937 | A1* | 6/2006 | Gatto et al. | 705/51 |
| 2006/0248351 | A1* | 11/2006 | Booz et al. | 713/189 |
| 2006/0253397 | A1* | 11/2006 | Gomez et al. | 705/50 |
| 2007/0006161 | A1* | 1/2007 | Kuester et al. | 717/126 |
| 2008/0140537 | A1* | 6/2008 | Powell | 705/26 |
| 2009/0319848 | A1* | 12/2009 | Thaper | 714/748 |
| 2010/0131928 | A1* | 5/2010 | Parthasarathy et al. | 717/126 |
| 2010/0218182 | A1* | 8/2010 | Hahn et al. | 717/178 |

* cited by examiner

*Primary Examiner* — Techane Gergsio
(74) *Attorney, Agent, or Firm* — Johnfar Kerlee (57) ABSTRACT

Disclosed are systems and methods for facilitating compliance with regulatory requirements concerning systems that must be qualified prior to use. In one embodiment, a qualified system is provided. The qualified system includes a qualified server and a qualified software application. The qualified system is located in a controlled environment specified and controlled by an application service provider. A qualified workstation is provided at the point of use. The qualified workstation and qualified system are configured to communicate with each other via a public computer network. The qualified system is substantially qualified before a specific customer is identified. Other embodiments of the invention pertain to methods of facilitating regulatory compliance. An exemplary method involves qualifying a system based on a generic functional requirement specification before identifying a specific customer for the system. After the customer is identified, additional qualification may be performed to customize the system to the customer's specific needs.

6 Claims, 5 Drawing Sheets

SYSTEMS AND METHODS FOR REGULATORY COMPLIANCE WITH QUALIFIED SYSTEMS

PRIORITY CLAIM

Benefit of priority under 35 U.S.C. §119(e) is claimed based on U.S. Provisional Application No. 61/435,448, entitled, "An Improved Method for Qualification of Regulated Systems," filed on Jan. 24, 2011, which disclosure is hereby incorporated in its entirety herein by reference.

BACKGROUND

1. Technical Field

Embodiments of the invention disclosed generally relate to systems and associated methods for ensuring compliance with regulation requiring qualified systems for operation. In particular, embodiments of the invention are directed to systems and methods for performing the majority or all of the qualifying of application programs and/or computer systems based on generic requirements and before identification of specific users of said application programs and/or computer systems.

2. Description of the Related Art

In the United States, the Food and Drug Administration (FDA) requires manufacturers to use validated systems. The FDA requires the "validation" of systems that track data important to, for example, the quality, safety, efficacy, and potency of a pharmaceutical product, such as clinical trial data, calibration data and scheduling, and maintenance scheduling, among others. Typically, validation consists of generating documented evidence which provides a high degree of confidence that the system will perform as expected and in a manner appropriate for its intended use. Usually, among other things, this involves verifying that the system has been developed based on documented procedures, has been installed as recommended by the manufacturer, and operates correctly as installed in a manner consistent with its intended use.

Currently software is not delivered pre-qualified because whether a system works correctly or not is determined at least partially by the manner in which it is installed and operated. Also, an otherwise qualified system may not be qualified for a particular use, or for use in a particular manner. As used here the term "system" means a combination of computer hardware and software components. A system, therefore, does not exist in its final form until hardware and/or software is installed at a customer site, on the customer's chosen hardware. As a result, a great amount of time and effort is spent upon each installation of a system to verify that the system meets the aforementioned criteria by qualifying the system after the software has been installed. Often, for software applications installed on a company network, the cost and duration of qualification of the computer system can exceed the cost of the software itself. The pharmaceutical industry as a whole spends significant resources in qualification even though many of the software packages used are common to many companies. This is increasing as the FDA becomes more familiar with software development and is applying stricter standards (reference 21 CFR Part 11). Often companies spend months qualifying a computer system at a high cost because such companies do not have in-house expertise in this area. This can be a challenge for small companies.

In addition to the effort required for the initial qualification, current qualification practices tend to lock companies into a fear of change, as each subsequent change (or upgrade) requires implementation of change control to ensure that a change is not detrimental to the operation of the system. This approach slows development and implementation of computerized tools that would greatly assist a company in implementing best practices to improve efficiency, accuracy, and productivity.

Usually, if a company desires to use a software application to support a critical function that would require validation, the company purchases the software from a software development firm and installs it on the company network or a stand-alone workstation.

Typical pharmaceutical software purchase and/or development projects generally include generating functional requirements, developing the software or purchasing over-the-counter software, testing the software during development (if applicable), installing the software at the customer location, validating the software (including installation qualification, operational qualification, and performance qualification as applicable), placing the system in use, and implementing change control.

Currently qualification of software generally involves a diverse project team for months from the inception of the project and costs tens of thousands of dollars to complete. Additional improvements to software can be burdensome even if beneficial, and changing to a different software package can be cost prohibitive. This prevents companies from using the best available software and may prevent smaller companies from using any software at all, since manual systems do not require qualification and may be easier to implement.

According to generally known practices in the industry, a customer/user must be involved virtually through the entire validation lifecycle of the project to ensure that the development appropriately meets the customer requirements. Additionally, the resulting system must be qualified in the installed configuration, which requires qualifying the system after purchasing it. This results in significant delays, costs incurred, and a reluctance to maintain the current revision of the software due to change control requirements.

Technology to date within the pharmaceutical industry has just begun considering qualification in the context of the Internet. The FDA has concluded that the Internet can be a "trustworthy and reliable communications pipeline for electronic records when certain measures are in place." However, little has yet been proposed in the way of qualification solutions, except for the FDA indicating briefly that it "recommends use of digital signature technology and delivery acknowledgements (such as receipts, or separate confirmations executed apart from the Internet), in addition to validation of both the source and destination computer systems."

It is known to use databases on the Internet, methods of ensuring that data transmitted on the Internet is accurate, and methods of performing a variety of Internet commerce related activities. However, the prior art is not cognizant of methods or systems applied to qualification of software/hardware system to achieve regulatory compliance, using the Internet, and wherein the software/hardware system is substantially qualified before a specific customer is identified.

SUMMARY OF ILLUSTRATIVE EMBODIMENTS

Disclosed are systems, methods, and computer programs for ensuring compliance with regulation requiring qualified systems for operation. Certain embodiments of the invention are directed to systems and methods for performing most or all of the qualifying of application programs and/or computer systems based on generic requirements and before identification of specific users of said application programs and/or computer systems.

In one aspect, the invention is directed to a method of facilitating compliance with regulatory requirements for the use of a qualified system. The method includes the steps of providing a qualified software application in a computer system and controlled environment; receiving at least one indication from a customer that the qualified software application meets regulatory requirements applicable to the operations of the customer; granting to the customer access to the qualified software application via a public computer network; and wherein the qualified software application is located remotely from the relevant operational facilities of the customer. In some embodiments, the method also includes installing a qualified workstation at the customer location. In another embodiment, the method also involves performing additional qualification of the software application at the request of the customer. In yet other embodiments, the method involves installing, testing, and qualifying the computer system before a specific customer for the software application is identified. In other embodiments, the method further includes qualifying the software application on a predetermined computer system and in a predetermined environment where the software application will reside throughout its lifecycle. In certain embodiments, the method further includes producing a requirements document to be used by an eventual customer; wherein said eventual customer is not directly involved in the production of said requirements document. In yet other embodiments, the method involves the qualification plan including assumptions about the intended use, method of use of the qualified software application, associated methods, and other general company procedures that are required for the qualified software application to be used in a qualified manner, and wherein the assumptions are verified as part of whether a customer meets one or more requirements to use the qualified software application. In certain embodiments, the method further comprehends performing additional qualification after identification of a specific customer based on customization of the qualified software application. In some embodiments, the method can include performing additional qualification, after identification of a specific customer, based on a failure of the customer to meet the assumptions. In another embodiment, the method further includes performing additional qualification, after identification of a specific customer, to address additional qualification requirements unique to the customer. In some cases, the method can include monitoring and displaying information regarding the qualification status of the qualified software application at the point of use. In some, the method is such that the qualified software application is configured to perform the monitoring and displaying. In some embodiments, the method includes a software module separate from the qualified software application configured to perform the monitoring and displaying. In some embodiments, the method can include testing the computer system at the at an application service provider (ASP) or customer site performed by a qualified automatic test system, wherein automated test routines and/or equipment are tested prior to use. In other embodiments, the method can involve using standardized equipment by the ASP to reduce the need for multiple protocols to reflect multiple configurations. In yet other embodiments, the method involves having the customer rely on the ASP testing to comply with regulatory requirements, and wherein the customer is not directly involved in the generation of functional requirements, development of the software application, or installation and testing of the hardware that cooperates with the software application.

In certain embodiments, the method entails delivering software installed for installation at the customer site similarly pre-qualified, instead of using a server at an ASP and a workstation at the customer location. In one embodiment, the method can include using standardized equipment by the ASP to reduce the need for multiple protocols to reflect multiple configurations.

Another aspect of the invention concerns a qualified computer system. The qualified computer system includes a qualified application server; a qualified software application residing in the qualified application server; a qualified workstation connected to the qualified application server via public computer network, the qualified workstation configured to access the qualified software application; wherein the qualified application server is located at the site of an application service provider and the qualified workstation is located at the site of a customer of the application service provider, the customer being a user of the qualified software application; and wherein the qualified application server is located remotely from the relevant operational facilities of the customer. In some embodiments, the qualified computer system includes a qualified workstation that is originally a workstation of the customer, and wherein the workstation of the customer is qualified at the customer location. In some cases, the qualified computer system is such that the portion of the code at the qualified application server is maximized. In yet other embodiments, the qualified computer system is such that the portion of the code at the qualified workstation is minimized. In some embodiments, the workstation qualified at the site of the ASP is installed at the customer site to reduce the qualification required after deployment.

Yet Another feature of the invention relates to a method of providing a qualified software application via a public computer network. The method includes the steps of developing a software application in a controlled environment consistent with predetermined regulatory requirements, the controlled environment configured and operated by an application service provider (ASP), the controlled environment located at a site of the ASP; developing the software application to meet a set of standardized functional requirements; providing a computer system in the controlled environment; installing the software application on the computer system; qualifying the software application on the computer system prior to involvement of a prospective customer of the ASP, the prospective customer being an entity having operations that are subject to the regulatory requirements; making the software application available to the customer via a public computer network, wherein the customer operates at a facility that is remotely located with respect to the computer system located at the ASP; generating evidence, as required by the customer, of proper development, operation, and suitability for use of the software application and computer system to meet the regulatory requirements; wherein the customer relies on testing performed by the ASP to comply with the regulatory requirements; and wherein the customer is not directly involved in generating the application requirements, the core components of the software application, or the hardware of the computer system configured to cooperate with the software application. In some embodiments, the method is such that the customer is required to meet specific requirements to use of the system in a qualified manner for regulatory compliance. A further aspect of the invention is addressed to a method of complying with regulatory requirements for a qualified software application. The method includes the steps of engaging an application service provider (ASP) to gain access to a pre-qualified software application; relying on the ASP for the bulk of the qualification of the software application; and accessing the pre-qualified software application via a public computer network, wherein the software application is located remotely, from a user of the software application, at a location of the ASP.

Yet another feature of the invention is directed to a method of complying with regulatory requirements for a qualified software application. The method involves the steps of engaging an application service provider (ASP) to gain access to a pre-qualified software application; relying on the ASP for the bulk of the qualification of the software application; and accessing the pre-qualified software application via a public computer network, wherein the software application is located remotely from a user of the software application, at a location of the ASP. In some embodiments, the method also includes qualifying the customer to use the system by providing training, and other specific requirements on which the qualification of the software was based.

In one embodiment, the invention concerns a method of facilitating compliance with regulatory requirements for a qualified software application. The method includes the steps of qualifying a software application on a specific computer system and environment where the software application is to be used; granting access rights to the qualified software application to a customer of an application service provider (ASP) to remotely use the qualified application; and wherein the customer is not involved in the bulk of the qualification of the software application and/or computer system.

Yet another embodiment of the invention is directed to a method of facilitating compliance with regulatory requirements for a qualified software application. The method includes the steps of qualifying a software application on a specific computer system and environment where the software application is to be used; granting access rights to the qualified software application to a customer of an application service provider (ASP) to remotely use the qualified application; and wherein the customer is not involved in the bulk of the qualification of the software application and/or computer system.

Another feature of the invention concerns a method of facilitating compliance with regulatory requirements for a qualified software application. The method involves the steps of developing and qualifying a software application for a predetermined computer system and in a predetermined controlled environment, the bulk of the developing and qualifying performed by an application service provider (ASP) without involvement of an eventual customer of the ASP for the qualified software application; indicating that the qualified software application suitably meets the regulatory requirements applicable to an identified customer of the ASP; the ASP granting use rights to the identified customer to use the qualified application; the identified customer using the qualified software application from a location remote from the identified customer.

In some embodiments, the invention is directed to a method of facilitating compliance with regulatory requirements for a qualified software application. The method includes the steps of providing a controlled environment; providing an application server in the controlled environment; installing a software application on the application server; qualifying the software application in the application server and the controlled environment; receiving an indication from a customer that the qualified software application meets a set of regulatory requirements applicable to operations of the customer; and granting to the customer use of the qualified application via a public computer network. In some embodiments, the method is such that the qualifying the software application is performed such that the customer is not substantially involved in qualifying the software application.

Yet another feature of the invention relates to a method of facilitating compliance with regulatory requirements for a qualified software application. The method involves the steps of determining a set of requirements for a computer system in accordance with a predetermined set of regulatory standards; developing an application program to meet the functional requirements; testing the application program to ensure that the application program meets the functional requirements; installing the application program on a qualified computer system, said qualified computer system located in a predetermined and controlled environment; producing installation qualification documentation to ensure that the application program has been installed properly; generating qualification protocol(s) and testing the application program according to said protocol(s) to ensure that the application program meets operational requirements included in the functional requirements; wherein the steps of determining a set of functional requirements, developing the application program, testing the application program, producing installation qualification documentation, and testing the application program according to the operational qualification protocol are performed before a specific user of the application program is identified and are performed at a location remote from operational facilities of the specific user; and after identification of a specific user for the application program, performing additional, minimum qualification of hardware and/or software to ensure that the application program operates as intended and in a manner consistent with use as operated from the location of the specific user. In some embodiments, the method can also include performing change control on the qualified application software and/or computer system by implementing changes to the application software and/or computer system primarily at a location remote from the location of the specific user. In yet other embodiments, the method can additionally involve developing and qualifying custom modifications after a specific user of the application program has been identified. In other embodiments, the method is such that qualifying custom modifications involves qualifying the custom modifications based on standardized protocol generated by an application service provider before identification of the specific user. In other embodiments, the method includes verifying that the user is qualified in order to ascertain that the user employs the software in a manner consistent with assumptions made during development of the qualification plan. In some embodiments, additional qualification may be required to address discrepancies between assumptions made during the development of the qualification plan and the implementation of the system by the user.

In one embodiment, the invention is directed to a method of facilitating compliance with regulatory requirements for a qualified software application. The method involves the steps of, based on a set of assumed requirements for a generic user, qualifying an application program in a given computer hardware/software system in a predetermined, controlled environment; identifying a specific prospective user of the application program; receiving verification from the prospective user that the prospective user meets the assumed requirements; and upon acceptance of said verification, granting to the specific user access rights to the application program, wherein user access to the application program is accomplished via a public network.

Another aspect of the invention addresses a method of validating Internet software applications. The method includes the steps of developing a software application in a controlled quality environment consistent with regulatory requirements of an industry for a generic customer; developing the software application to meet standardized functional requirements; installing the software application on a computer system at an application service provider (ASP) location in a secure environment; validating, the software application on the installed system at the ASP prior to involvement of a customer; making the software application available to the customer via the interne; providing evidence of suitability for use and proper development and operation of software to meet regulatory requirements; and wherein the customer relies on the ASP testing to comply with regulatory requirements; and wherein the customer is not directly involved in the generation of functional requirements, development of the software application, or installation and testing of the hardware that cooperates with the software application. In some embodiments, the method also includes using standardized equipment by the ASP to reduce the need for multiple protocols to reflect multiple configurations. In yet other embodiments, the method of is such that the software is not installed exclusively at the ASP location but partially installed at customer location as well. In some instances of the inventive method some testing is performed after involvement of the customer to support the qualification of the software application. In certain embodiments, the method can include performing additional validation as required by a customer to meet regulatory requirements or internal requirements. In certain other embodiments, the method can also involve qualifying the application program to functional requirements prior to involvement of the customer. In one embodiment, the method is such that the test protocols are standardized to take advantage of using standardized equipment at ASP. In other embodiments, the method is such that a portion of the testing is performed after involvement of the customer but is reduced by customer acceptance of prior testing based on standardized portions of the functional requirements. In another embodiment, the method is such that a portion of the testing is performed after involvement of the customer but is reduced because the testing has already been performed on the portion of the system as it is installed in its final configuration. In yet other embodiments, the method can also include re-testing performed at ASP or a modified version of said testing is used as evidence of compliance with requirements. In yet another embodiment, the method is such that testing involves one or more of the following steps: testing manually based on a test protocol; testing using queries; automated testing using other computer equipment. In other embodiment, the method is such that the ASP site and the system are replaced by a system delivered with software installed for installation at customer site similarly pre-qualified. In one embodiment, the method can include a test capability within the pre-qualified software that tests the workstation for the appropriate installation and functionality of required software, hardware, and/or other workstation capabilities at the workstation further reducing the required additional qualification. In other embodiments, the method can also involve the use of standardized functional requirements or equivalent document as a tool for ensuring that the requirements of the software are appropriate to its intended use, communication of the requirements to the customer, and validation of the software to the requirements specified therein prior to use by a customer. In some embodiments, the method is such that the validation occurs after an agreement between customer and ASP on a system provided by or arranged by the ASP to be consistent with previous qualifications of the ASP software. In other embodiments, the method can include qualifying the customer to verify that the customer employs the software in a manner consistent with assumptions made during development of the qualification plan. In some embodiments, additional qualification may be required to address discrepancies between assumptions made during the development of the qualification plan and the implementation of the system by the customer.

Yet another aspect of the invention concerns a system for qualification of software applications. The system includes minimal installed software at customer site, wherein installed software at customer site is limited to commonly used software; a software application developed in a controlled quality environment consistent with regulatory requirements, wherein the software application is developed to meet standardized functional requirements; a computer system hosting the software application at the ASP site during normal operation, wherein the software is used via said computer system; a communication link to the Internet for a customer having access to the software application remotely; wherein the computer system at the ASP location is in a secure environment. In one embodiment the system can also include software installed at the ASP to detect whether software at the customer site remains as verified in the qualified state. In another embodiment, the system can include software installed at the ASP to notify the customer and/or ASP as to the qualified status of the application software. In yet another embodiment, the system can also include a software module for periodic validation of data transfer to support the qualification documentation.

In one embodiment the invention relates to a method of providing change control for software applications. The method includes the steps providing a software module to monitor changes to a software application and/or computer system; performing change control support at the ASP to minimize involvement a customer that uses the software application remotely; and providing qualified software functions that verify proper operation of the software application in real time.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF ILLUSTRATIVE EMBODIMENTS

In the following detailed description of exemplary embodiments of the invention, specific exemplary embodiments in which the invention may be practiced are described in sufficient detail to enable those skilled in the relevant technology to practice the invention, and it is to be understood that other embodiments may be used and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

This invention can be used where qualification of systems for their intended use is required to meet regulatory requirements. This would be useful in USFDA (United States Food and Drug Administration) regulated industries as well as others. This invention could be used to produce databases, control systems, data analysis applications and other computer applications for use by regulated entities.

With regard to certain embodiments of the inventive methods and systems disclosed here that are specifically applicable to FDA regulated systems, as used here the term "qualification" means "validation" as it is commonly used when referring to FDA regulated systems, as well as similar qualification that may be required by other industries. Hence, in such a context, the term "qualification" excludes the usual testing and verification performed in the development of systems for non-regulated industries.

Current methods of qualifying software for use in regulated environments require the user to qualify the system after it is installed on the user's site. This does not allow the software to be qualified before it is purchased and therefore requires a significant investment after the user decides to adopt the system. The standard approach for qualifying systems for regulated use also requires burdensome change control to be implemented to verify that changes to the system do not cause undesired effects. The cost of qualifying software for use in regulated environments often exceeds the cost of purchasing the software. There is no standard method for pre-qualification of internet applications for use in regulated environments.

Certain embodiments of the inventions disclosed here allow for pre-deployment of qualified systems for use in a regulated environment. This is accomplished by performing the qualification on the specific equipment and in the specific environment wherein the software will reside throughout its lifecycle.

In some embodiments, these systems and/or methods disclosed here are an improvement over the existing software development, deployment, and qualification methods because they allow pre-qualification of the hardware/software system. Normally, the system must be qualified after involvement of the customer. Inventive embodiments disclosed here minimize the amount of qualification required after the customer begins using the application.

The term "qualification" is used herein to refer to certain required activities performed after installation of the system at the location of its intended use related to meeting regulatory requirements. Similarly, terms such as "installation qualification" (IQ), "operational qualification" (OQ), "performance qualification" (PQ), and "change control" are used herein to provide a contextual reference since these terms are well known in the pharmaceutical and medical device industries to which some embodiments of the invention apply. Said terms are not intended as complete or limiting definitions as to the applicability of the inventive process or system. The terms "validation" and "qualification" can be used interchangeably for the purpose of this discussion.

As used here, the term "controlled environment" refers to certain conditions and activities typically called for in regulatory requirements at the server location. Usually this includes, but is not limited to, physical conditions, utilities, emergency support, procedural controls, revision and change impact and control, training, and other aspects of the operation that may affect the ability to meet regulatory requirements.

Although regulated environments, and more specifically FDA regulated activities, are often used in the description and disclosure of the inventive embodiments provided herein, it is intended that the inventive principles and concrete embodiments, and logical extensions thereof, are not limited to applications involving government regulations or other equally or more stringent regulatory regimes. The methods and systems described here can be useful in business and industries that employ systems that must pass some form of testing, qualification, and/or validation (not necessarily in the FDA sense) before the systems can be deployed for their intended ordinary use.

The term "Functional Requirements Specifications" is used herein to refer to documentation used to describe what the system and/or software is required to perform. Additionally, it is understood that such documentation may include information on "how" the required functions are performed as might be expected in a specification. As such, said documentation may consist of one or more documents that collectively perform this function and communicate it to potential customers and is not necessarily restricted to the definitions exemplified in the following text or considered exclusive of other terms commonly used for similar documents.

Figure 1:
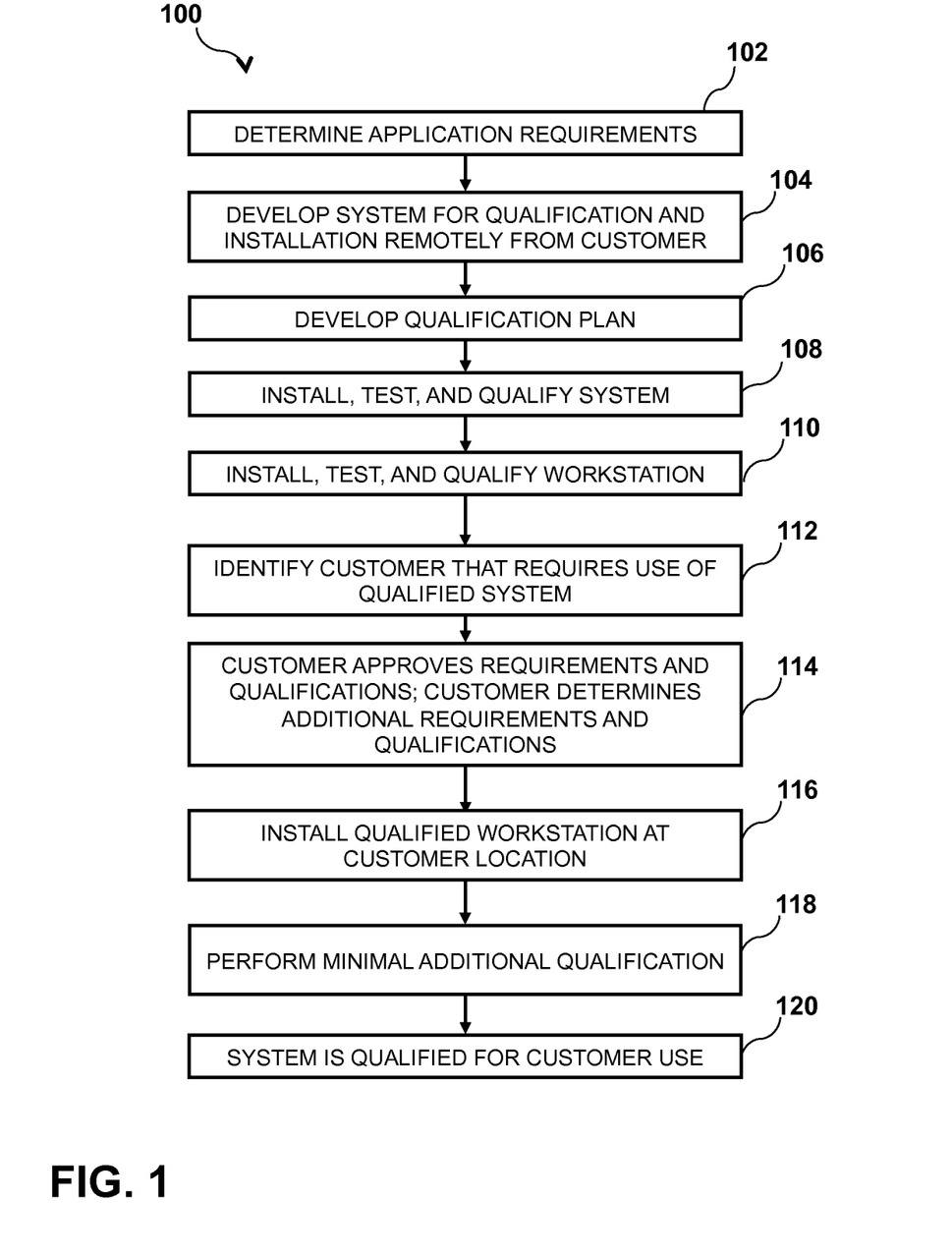
FIG. 1 is a flowchart of one embodiment of a method of facilitating compliance with regulatory requirements for qualified computers systems.

Referencing FIG. 1, in one embodiment the inventive method 100 involves the following steps: At a step 102 the requirements for the application are determined. The requirements for the application are based on regulatory requirements published by regulatory agencies as they apply to the application in addition to other requirements that may be well understood for the type of system. These requirements are determined based on the regulatory requirements and understanding of the industry and other industry sources. A document that emerges from this step is used as a requirements document for any customer in the referenced industry, although the customer is not directly involved in its development.

At a step 104 the system is designed such that the majority of the software and hardware are installed at a predetermined site other than the customer location. The application portion that is required at the customer location is minimized to reduce the qualification required after identification of the customer. As used here, the term "majority" means more than 50-percent, preferably more than 60-percent, even more preferably more than 70%, and most preferably more than 75%. In determining these percentages, consideration is given to one or more of the resources involved in qualifying a system; said resources including, but not limited to, time, expense, and/or equipment (including software and/or hardware).

At a step 106 a qualification plan is developed that maximizes the portion of the qualification performed prior to identification of the customer. Some portion of additional qualification may be required, but should be minimized. In some embodiments, a qualification plan specifies assumptions made that are relevant to the plan, and which a customer must meet to make the qualification of the system effective. The person of ordinary skill in the art will recognize that steps 102, 104, and 106 may be combined, commingled or performed in a different order.

At a step 108, the system is installed, tested, and qualified at a site other than the customer site to the extent possible. Qualification is performed on the equipment on which software and hardware will reside as it is intended to be used. In certain embodiments of method 100, a range of qualified workstation configurations can be tested, thereby providing confidence that a given configuration of a workstation can be qualified for use by a later identified customer. In certain embodiments of method 100, one or more of these qualified workstations is used by a customer as the interface to the qualified system to reduce qualification time at the point of use.

At a step 110, the system is qualified using an interface similar to what a customer would be expected to use, including a workstation and an internet connection. A typical qualification may include installation and operational qualification, among others, and reports. Testing and/or qualification may determine specific configurations required at the customer site for proper operation. These may be verified as part of a final qualification. In one embodiment, the specific configurations required at the customer site are added to the qualification plan assumptions and verified in the final qualification (in step 118). In one embodiment, qualified workstations are retained in the event that a customer, once identified, desires the fastest qualification. This can be achieved by installing the qualified workstation at the customer location. A person of ordinary skill in the relevant technology, will recognize that steps 108 and 110 can be combined or commingled.

At a step 112 a specific customer is identified. At a step 114, the customer reviews and approves the requirements document generated in step 102. This verifies that the qualification will address the needs of the customer. The customer also reviews the qualification reports. In one embodiment, the customer reviews the qualification plan (106) and reports (108, 112) as the customer may deem necessary. Any additional qualification requirements are determined with the customer. The additional requirements can arise because of required modifications to the system, additional customer requirements, use of a non-qualified workstation at the customer site, customer qualification discrepancies, or other reasons.

At a step 116, the qualified workstation is installed at the customer location and connected to the internet. In an alternative embodiment, a customer can use a different workstation, which workstation can be qualified.

At a step 118, a minimal amount of additional testing and/or qualification is performed to complete the qualification of the system as determined by agreement between the provider and customer. In one embodiment, the qualification can include a verification that the customer, configuration, and prevailing conditions meet the requirements of the assumptions developed as part of the qualification plan (106) and system and workstation qualification steps (108, 110).

At a step 118, additional qualification may be required for non-standard components of the system. At a step 120, the system is qualified and ready for use.

The elements required for this invention include the installation of the software on the hardware prior to qualification testing. This occurs before the customer qualification is initiated. The identification names for the documents are variable and additional documents may be required as applicable to a particular system. In some embodiments, the qualification is based on assumptions that are verified after the client is identified. Hence, an inventive aspect of certain embodiments of method 100 is the development of said assumptions.

Additional software and/or hardware can be added to monitor and/or control the status of any parameters important to the proper operation of the system including, but not limited to: 1) the security of the connection; 2) data integrity; 3) the hardware and/or software installed at the server or workstation; 4) the identity of qualified users; 5) hardware and/or software status; 6) identification of hardware and/or software updates required; 7) other parameters related to status or configuration that may affect the ability of the system to operate correctly. This additional component could display relevant information and/or perform appropriate functions to ensure the security and qualification are not compromised. Scripts could be used to automatically perform qualification functions periodically and/or upon initial installation.

The steps of method 100 may be executed as described above or may be performed with some variations. The key that makes the method unique is that the majority of qualification occurs before the involvement of the prospective customer, other than as an advisory role. The customer becomes involved after the bulk of the qualification is complete. It is also important to the invention that the software and hardware are installed and qualified at a site other than the customer site initially. After qualification, the hardware and software can be moved, but the software must remain on the same hardware on which it was qualified to minimize additional qualification. For example, if a new customer workstation is used in lieu of a prequalified workstation, this would increase the additional qualification required in Step 118. In yet other embodiments of inventive method 100, an additional component of the qualification is a focus on the qualification of the customer to meet assumptions of the qualification plan in addition to the qualification of the software to meet the customer requirements.

Method 100 allows for pre-qualification because the software is installed on the hardware and in the environment where it will be used as a qualified system. This obviates the need to for a majority of the software qualification after it is installed at the customer location, because it has already been qualified on the equipment with which it will be used. It also works because the customer reviews the requirements to make sure they are appropriate for the customer, as well as the qualification documentation. In certain embodiments, method 100 is effective in that the assumptions on which the qualification plan is based are verified to be accurate upon identification of the customer.

Furthermore, having the system installed remotely and via internet allows the system to operate somewhat independently of the customer LAN and server configurations and therefore avoids a significant number of potential conflicts.

The qualification documentation may include any documents required by the customer to determine that it has a high degree of confidence that the system will operate as intended and pass regulatory requirements. Portions of the qualification may be performed automatically during installation and/or regular use.

Figure 2:
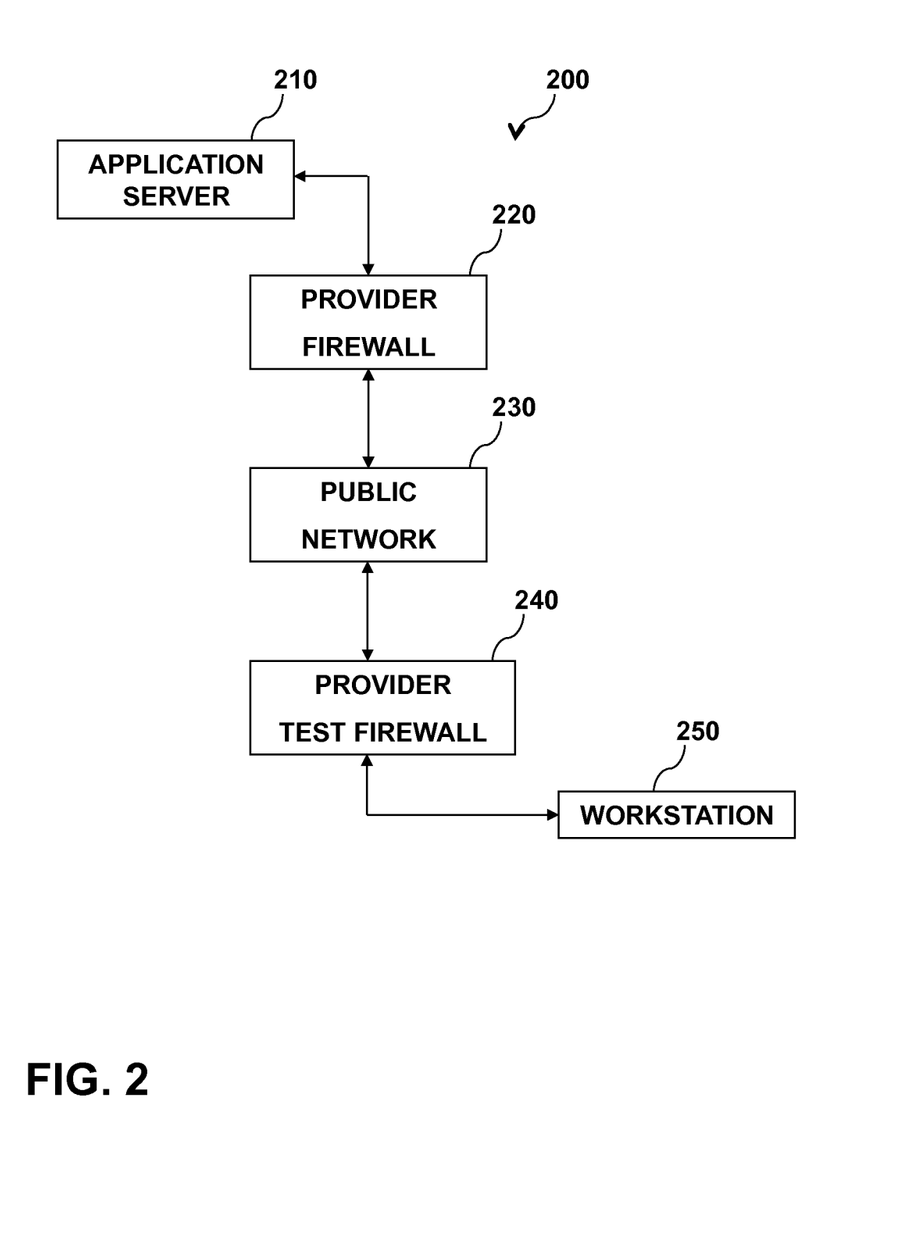
FIG. 2 is a block, schematic diagram of a computer system configured for qualifying a software application and a computer system according to certain aspect of the method shown in FIG. 1.

Referencing FIG. 2 now, in one embodiment system 200 is set up for development and qualification as follows. System 200 includes application server 210 connected to provider firewall 220. Public network 230 is in communication with provider firewall 220 and provider test firewall 240. Workstation 250 is in communication with provider test firewall 240. Public network 230 can be, for example, the Internet, which provides support for the World Wide Web. As stated above in the description of method 100, system 200 is installed, tested, and validated at the site of the application provider, rather than a customer site, and the customer's involvement at this point of the process is nonexistent or very peripheral. System 200 is designed so that the portion of the application code at the server is maximized. Also, the portion of the application code at the workstation is minimized. In certain embodiments of System 200, included are other components such as backup systems, web servers, etc., as required for implementation of the application on the network in a manner to meet designated requirements.

Figure 3:
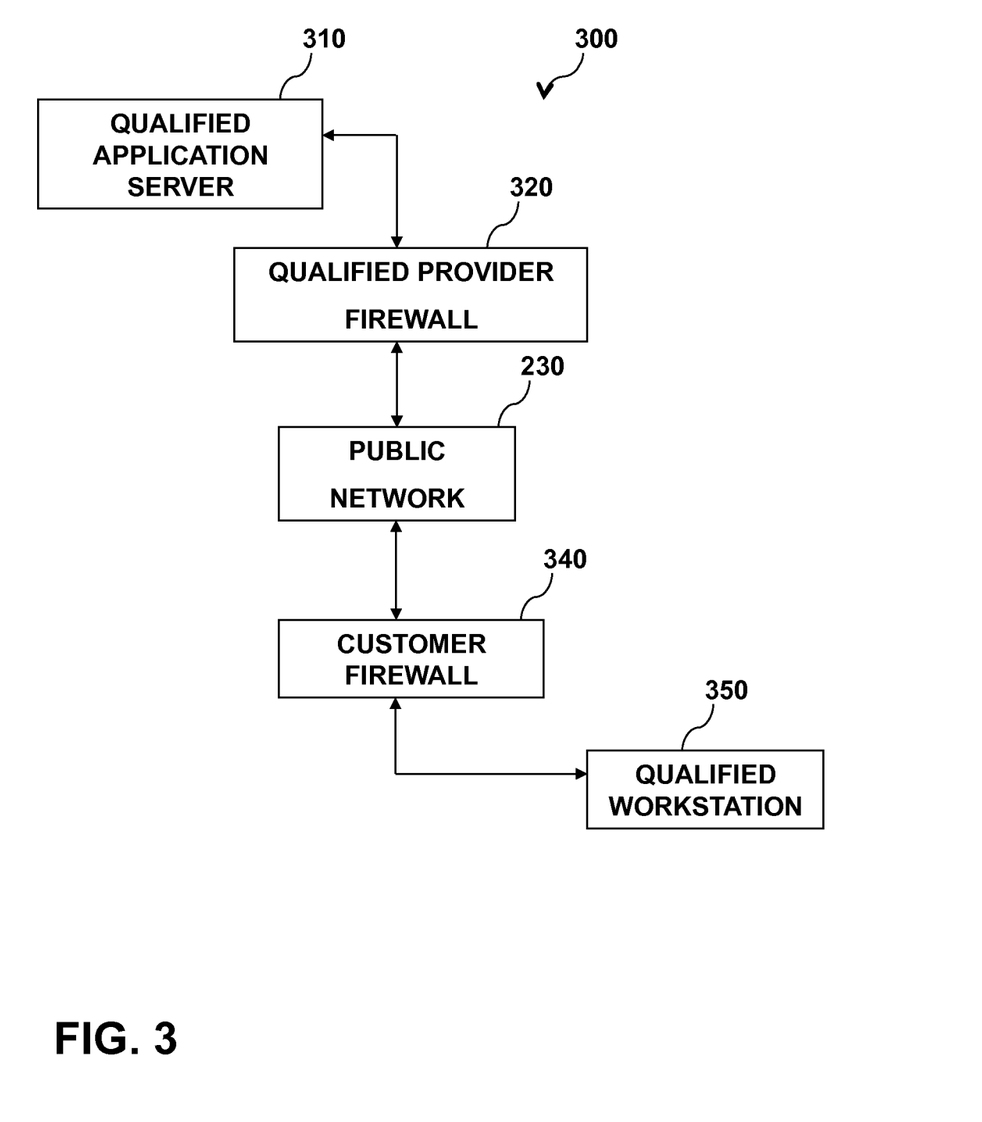
FIG. 3 is a block, schematic diagram of a computer system configured for deployment of a qualified software application and/or computer system according to certain aspect of the method shown in FIG. 1.

Turning to FIG. 3 now, a configuration for qualified system 300 is shown. Qualified application server 310 is in communication with qualified provider firewall 320. Public network 230 is in communication with qualified provider firewall 320 and customer firewall 340. Qualified workstation 350 is in communication with customer firewall 340. It should be noted that in some embodiments qualified workstation 350 is workstation 250 (FIG. 2) after it has been validated and relocated from the application provider site to the customer site.

Figure 4:
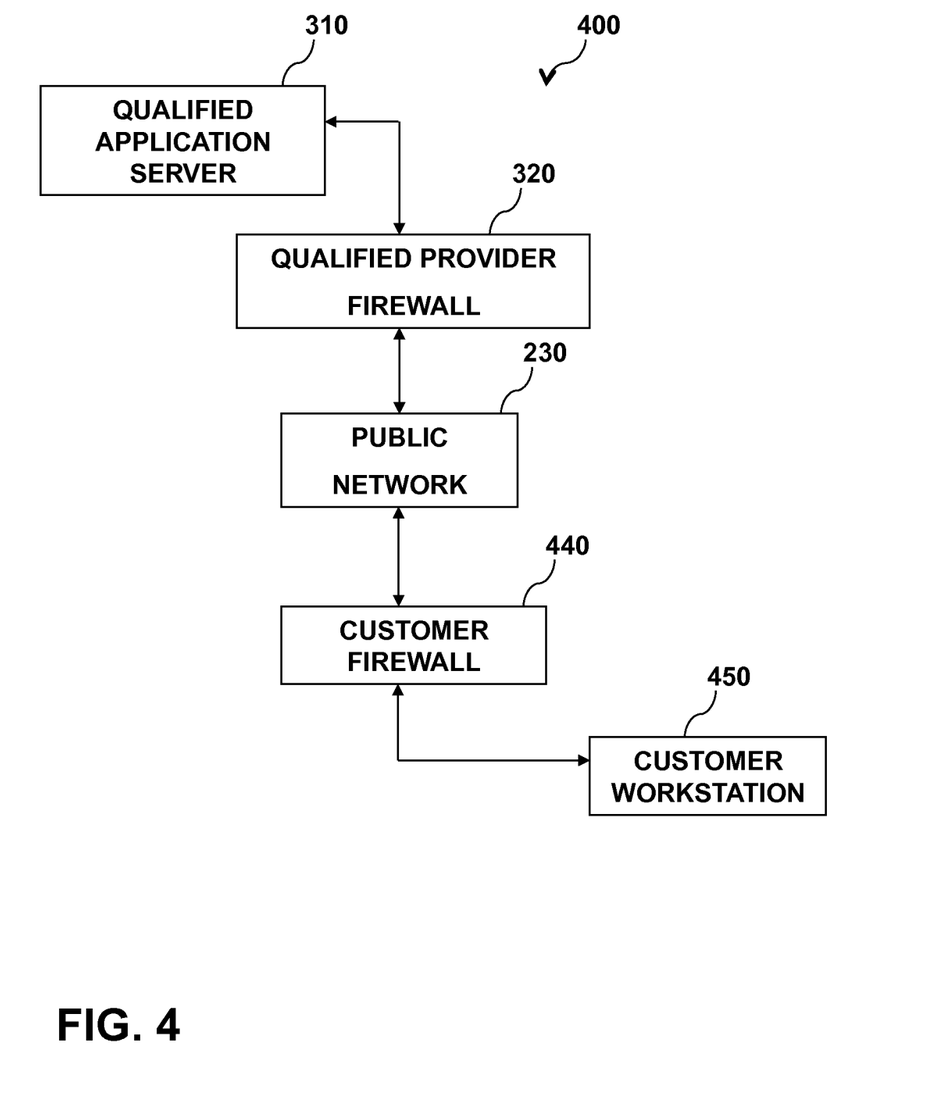
FIG. 4 is a block, schematic diagram of an alternative computer system to the computer system shown in FIG. 3.

FIG. 4 shows an alternative configuration to the configuration shown in FIG. 3. System 400 is configured similarly to system 300. However, system 400 includes customer workstation 450 rather than qualified workstation 350. Before use of system 400 in an actual deployment, customer workstation 450 is qualified. Customer workstation 450 can be part of a local area network (LAN) of the customer. In one embodiment, qualified application server 310 is qualified before deployment and does not change significantly (if at all) during deployment. Therefore, additional qualification is minimized. Customer firewall 440 and customer workstation 450 require additional qualification upon initial installation of system 400. Since qualified workstation 350 is qualified with qualified application server 310 originally, the additional qualification can be minimized if qualified workstation 350 is used instead of customer workstation 450. Additional qualification can also be minimized if the customer workstation has minimal software that requires qualification. In some cases, the additional qualification can be performed by logging in remotely to minimize impact. In some embodiments, systems 200 and 400 can include other components such as backup systems, web servers, etc as required for implementation of a given application on the network in a manner to meet designated requirements.

Figure 5:
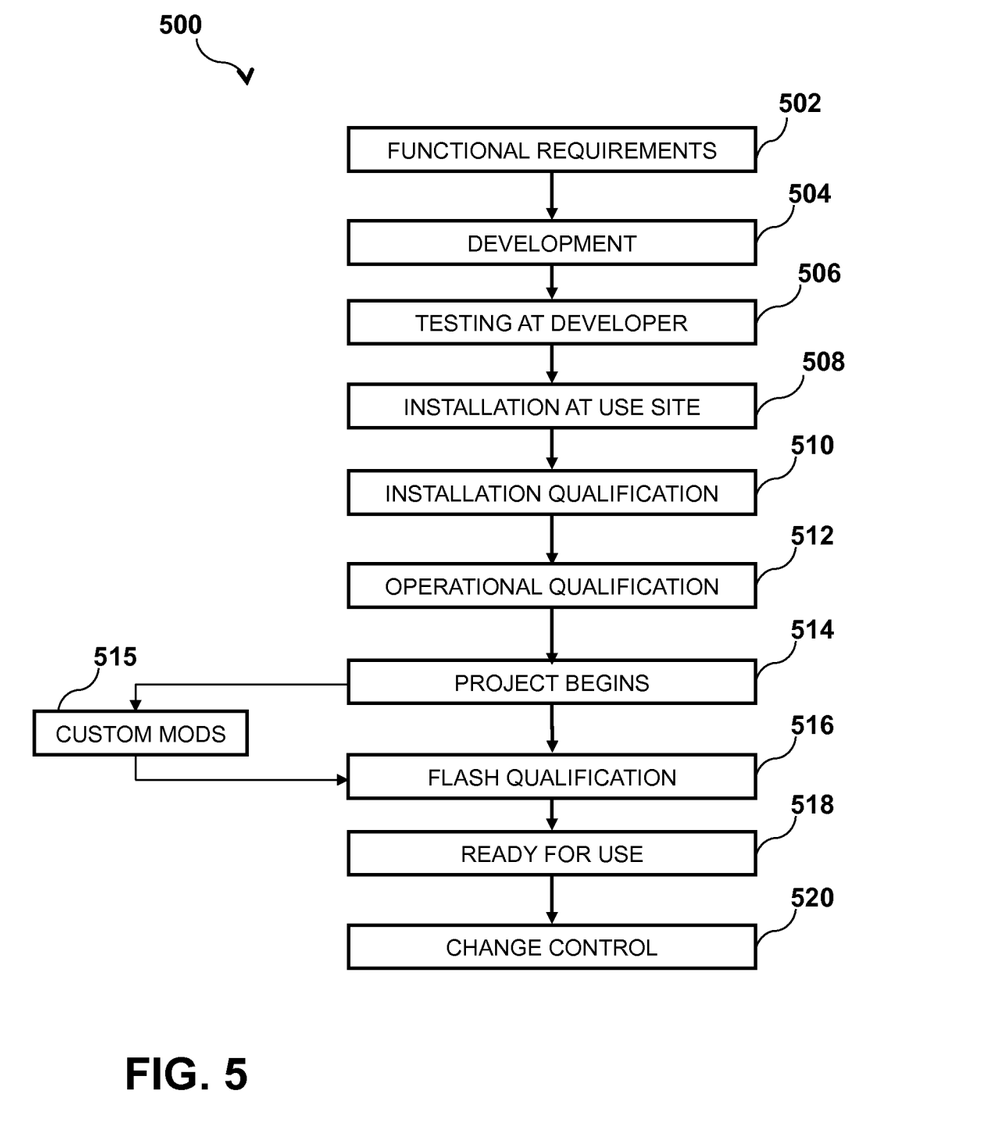
FIG. 5 is a flowchart another embodiment of a method of facilitating compliance with regulatory requirements for qualified computer systems.

FIG. 5 is a flow chart of a method 500 that embodies certain aspects of the invention disclosed here. A customer is involved in steps 514, 516, and 518, but the other steps are accomplished with minimal or no customer involvement. The bulk of the qualification (Steps 510, 512) is performed on a computer system prior to involvement of the customer.

As used here, the term "minimal" means less than 50-percent, preferably less than 40-percent, even more preferably less than 30%, even more preferably less than 25%, and most preferably less than 15%. In determining these percentages, consideration is given to one or more of the resources involved in qualifying a system; said resources including, but not limited to, time, expense, and/or equipment (including software and/or hardware).

At a step 502 (Functional Requirements), based on national, international, or industry standards; a developer or an application service provider (ASP) creates a standardized Functional Requirements Specification (FRS) aimed at the needs of a generic customer. Standardized FRS can be used to assist an eventual customer to develop approved Functional Requirements Specifications internal to the customer, which will be used at step 516 (Flash Qualification). Standardized FRS documents are generated in a format appropriate for wide use and in such a way that it is convenient for a customer to edit the FRS as the customer sees fit to meet the customer needs when the customer becomes involved. Standardized FRS clearly indicates which items are already included in the software developed as a standard (that is, items that are qualified prior to customer involvement). If the customer has additional requirements which are not included in the standardized FRS, the customer may require additional modules or modifications which would therefore potentially require additional qualification after involvement of the customer.

At a step 504 (Development), the ASP is set up from the beginning with a well-qualified staff, appropriate development procedures and resources, and software already developed to meet the standard FRS developed. At a step 506 (Testing at Developer), testing is performed at the ASP or developer site. This is testing performed at the ASP prior to deployment for customer use.

At a step 508 (Installation at Use Site), the use site is the ASP location, so installation at the eventual use site can be performed prior to identifying a client. The software is now it its final location and configuration. Qualification to the standardized FRS begins before a customer becomes involved. Heretofore, the prior art does not employ minimization of installation (preferably to use off the shelf interne access software) at the customer location and primary installation at the ASP server. When possible, computer systems used at ASP are standardized such that installations for different customers are as similar as possible to reduce differences in required qualification (that is, qualification) of systems. In certain embodiment, use of standardized hardware in a controlled environment for the installation is an inventive aspect of method 500. In one embodiment, for a computer system installed with standardized hardware/software protocols required for qualification of the computer system can be standardized as well. In some embodiments, qualification testing is performed using previously qualified test equipment or validation by a third party.

At a step 510 (Installation Qualification, IQ), qualification documentation is produced and testing and/or verification is performed to ensure that the system has been installed properly. Typically this includes verifying that the proper computer hardware and software are used to support the application software, documenting the configuration, checking physical security, etc. In one embodiment, IQ can be based on a standard protocol if care is taken to standardize installation configurations. In this manner, a single protocol can be executed many times for many client systems to reduce the overhead required. Alternatively, this can be performed to a large degree by a qualified automated test system.

At step 512 (Operational Qualification, OQ), a protocol is generated which tests the operational requirements of the FRS. Execution of the protocol can include testing security, backup operation, data manipulation, reporting functions, screen content, and anything else required by the FRS. OQ can require rework of some portions of custom-built software to address discrepancies that may arise. Additionally a Performance Qualification (PQ) may be required for some systems.

In one embodiment of the inventive method 500, OQ can be based on a standard protocol if care is taken to standardize installation configurations. In this manner, a single protocol can be executed many times for many client systems to reduce the overhead required. Alternatively, this can be performed to a large degree by a qualified automated test system. The prior art does not contemplate the performance of a majority of the qualification prior to client involvement.

At a step 514 (Project Begins), the project is conceived at the customer and the customer becomes involved and begins expending resources. At this point there is already a qualified system in place that can be put to use by the customer. The prior art is not cognizant of this inventive aspect of method 500. The only portion of the system that has not been qualified is the customer side of the system, which typically consists largely of a widely used internet browser and any attendant workstation hardware. In one embodiment, the customer reviews and accepts the standardized FRS of the SAP; in another embodiment, the customer modifies the standardized FRS as it deems necessary to reflect required custom features or other additional requirements. Modifications (if any) and the customer interface(s) need to be addressed in step 516 (Flash Qualification). The prior art does not describe such a method for addressing standardized and additional requirements. An inventive aspect of method 500 is that only the unique characteristics of a computer system, which have been minimized, need to be qualified after customer involvement.

In one embodiment of method 500, at a step 515 (Custom Modifications), if required, custom modifications can be developed and qualified in addition to the interface to the ASP software. Step 515 can be performed in different ways. For example, in one embodiment, qualification of customer modification can be based on a standard ASP generated protocol or a custom protocol generated by the customer, ASP, or third party. Based on acceptance by the customer of the standardized FRS documentation and prior qualification of the software on its installed system, the scope customer involvement in the qualification process is very much reduced from what it would have been if the qualification had started at step 514. In one embodiment, the customer could become involved and be ready to use a validated system in a matter of hours.

At a step 516 (Flash Qualification), any additional qualification required to provide a high degree of confidence to the customer that the software operates as intended and in a manner consistent with its intended use as operated from the customer location is performed. This part of the qualification may include testing the interface, additional untested requirements of the customer, etc.

At a step 518 (Ready for Use), after any additional required qualification has been executed and approved, the system is ready for use. The customer may have been involved for only days at this point, possibly only hours. The inventive method 500 makes it easy to change software, because the customer has not invested much; yet the quality and reliability of the software as installed can be expected to be high. The reduced customer time and resources involved in qualification are a characteristic of the inventive method 500.

At a step 520 (Change Control), change control can be applied in a fashion similar to the qualification, with as much as possible being performed at the ASP site. As an example, upgrades can be qualified at the ASP if they do not impact the workstation at the customer site. The prior art does not contemplate performing the change control to the degree possible at the ASP site. Additionally, in some embodiments, an application software may monitor the customer computer system (that is, workstation) for changes that may affect the qualified status of the application software, monitor data integrity, and notify both the customer and the ASP of the status of such changes.

One aspect of the invention disclosed here involves qualifying the customer to use the computer system (hardware/software) in a validated manner (as part of Step 516), as opposed to qualifying the software for use. This is done by verifying that the customer approves the requirements, and has standard operating procedures (SOPs), training, treatment of records and other requirements in place that were assumed during the qualification at the ASP. This process can be referred to as CQ, for "customer qualification". In some implementations, a customer can have additional coding requirements, and those are addressed separately and validated separately.

In some embodiments, to realize several of the benefits of the inventive methods and systems, it is important to recognize the structure of the relevant industry. For example, in certain FDA regulated industries, a company (or similar business entity) must qualify one or more of the systems it uses for conducting its operations or business. Usually, the company performs most, if not all, of the qualification in-house (that is, using primarily its own resources, such as employees, facilities, and/or equipment). However, in some cases, the company may outsource certain aspects of the qualification to outside vendors. It is in this context, that the company may be referred to as a "customer" of an outside vendor. Hence, for certain inventive embodiments disclosed here, it is beneficial to recognize that when a company acts as a customer of an outside vendor it is possible to provide qualified systems and/or qualification services in a manner that substantially reduces the time and/or costs that the company must invest in qualifying its systems. Hence, as used here, the term "customer" refers to an entity that is subject to regulatory requirements and engages outside vendors to provide qualification products and/or services for at least some portion of the qualification of its systems.

Aspects of the invention described here provide the following benefits, among others: better control the software installation environment, reduced software development costs, automated change control monitoring, potential integration with other Internet applications, remote use of installed qualified software, smaller investment required to provide use of software for evaluation, more reliable backup and protection of data at off-site location, multi-site shared access to software, installation which is not sensitive to a customer's workstation operating system(s), installation which functions with any Internet compatible system whether networked or stand-alone, real "pre-qualified" software, reduction in the need for qualification expertise within customer company, improvement in the ability of smaller companies to have access to the best software and latest revisions, dramatic reduction in the amount of testing required by a customer/user of the software/hardware system, reduction in the amount of research required to use software compliant with the customer's regulatory requirements, and reduction in the client's burden for change control, qualified, platform independent software. Many of these benefits have the effect of providing better, current software to the potential user base with a minimum of cumbersome and technically difficult qualification testing.

While the invention has been described with reference to exemplary embodiments, it will be understood by those skilled in the relevant technology that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A qualified computer system comprising:
   a qualified application server;
   a qualified software application residing in the qualified application server,
   a qualified workstation connected to the qualified application server via a public computer network, the qualified workstation configured to access the qualified software application during the intended ordinary use of the qualified software application;
   developing the qualified software application in a controlled environment consistent with predetermined regulatory requirements, the controlled environment configured and operated by an application service provider (ASP), the controlled environment located at a site of the ASP;

developing the qualified software application to meet a set of standardized functional requirements;

providing the qualified computer system in the controlled environment, wherein providing said qualified computer system comprises:

performing, at the location where the qualified computer system resides during its intended ordinary use, one or more activities required by one or more regulatory requirements; and generating documented evidence that the qualified computer system performs as expected and in a manner appropriate for its intended ordinary use;

installing the qualified software application on the qualified computer system;

qualifying the software application on the qualified computer system prior to involvement of a prospective customer of the ASP, the prospective customer being an entity having operations that are subject to the regulatory requirements;

making the qualified software application available to the customer via a public computer network, wherein the customer operates at a facility that is remotely located with respect to the qualified computer system located at the ASP, and wherein the qualified software application is configured to require that the customer connect to said qualified computer system during the ordinary intended use of the qualified software application;

generating evidence, as required by the customer, of proper development, operation, and suitability for use of the qualified software application and qualified computer system to meet the regulatory requirements;

wherein the customer relies on testing performed by the ASP to comply with the regulatory requirements; and wherein the customer is not directly involved in generating the qualified software application requirements, the core components of the qualified software application, or the hardware of the qualified computer system configured to cooperate with the qualified software application.

2. The qualified computer system of claim 1, wherein the qualified workstation is qualified at a location remote from the customer and then relocated to the location of the customer.

3. The qualified computer system of claim 1, wherein the qualified workstation is originally a workstation of the customer, and wherein the workstation of the customer is qualified at the customer location.

4. The qualified computer system of claim 1, further comprising a customer workstation, wherein the qualified application server remains in a controlled environment and the customer workstation is qualified after identification of the customer.

5. A method of providing a qualified software application via a public computer network, the method comprising:

developing a software application in a controlled environment consistent with predetermined regulatory requirements, the controlled environment configured and operated by an application service provider (ASP), the controlled environment located at a site of the ASP;

developing the software application to meet a set of standardized functional requirements;

providing a qualified computer system in the controlled environment, wherein providing said qualified computer system comprises:

performing, at the location where the qualified computer system resides during its intended ordinary use, one or more activities required by one or more regulatory requirements; and generating documented evidence that the qualified computer system performs as expected and in a manner appropriate for its intended ordinary use;

installing the software application on the qualified computer system;

qualifying the software application on the qualified computer system prior to involvement of a prospective customer of the ASP, the prospective customer being an entity having operations that are subject to the regulatory requirements;

making the software application available to the customer via a public computer network, wherein the customer operates at a facility that is remotely located with respect to the qualified computer system located at the ASP, and wherein the software application is configured to require that the customer connect to said qualified computer system during the ordinary intended use of the software application;

generating evidence, as required by the customer, of proper development, operation, and suitability for use of the software application and qualified computer system to meet the regulatory requirements;

wherein the customer relies on testing performed by the ASP to comply with the regulatory requirements; and wherein the customer is not directly involved in generating the application requirements, the core components of the software application, or the hardware of the qualified computer system configured to cooperate with the software application.

6. The method of claim 5, wherein the customer is required to meet specific requirements to use the qualified system in a qualified manner for regulatory compliance.

* * * * *